9788X
L. Hedge,
Wood Planing Machine.
Patented June 28, 1836.
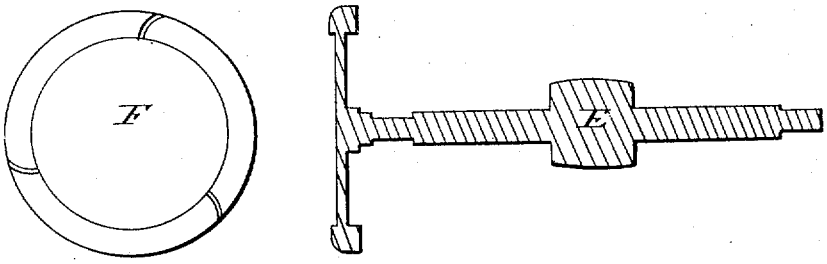
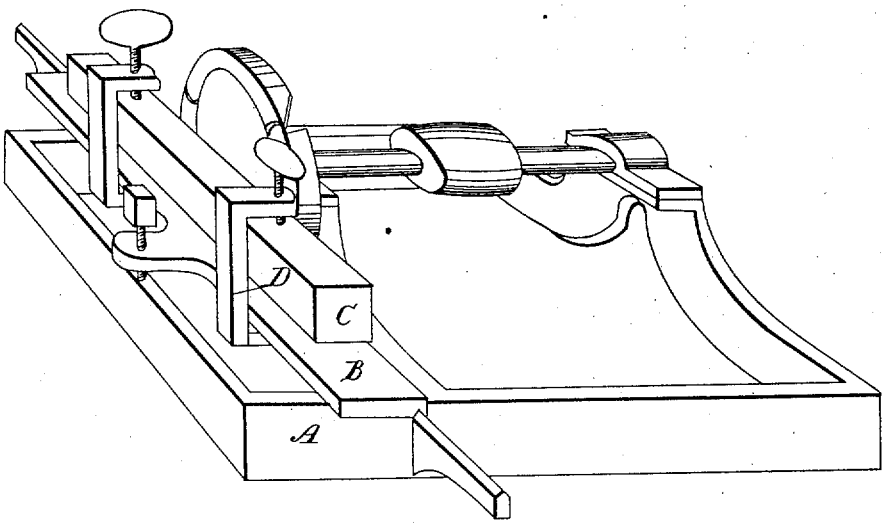
Witnesses.
Melvin Copeland
Henry C. Bolles.
Inventor.
Lemuel Hedge.
AM. PHOTO-LITHO. CO. N.Y. (OSBORNE'S PROCESS)

9788X June 28. 1836

Lemuel Hedge, of Brattleboro, Vermont.
Letters Patent

The schedule referred to in these Letters Patent and making part of the same, containing a description in the words of the said Lemuel Hedge himself of his "improvement in the revolving plane" —

To all to whom these presents shall come; Be it known that I, Lemuel Hedge of Brattleboro, in the County of Windham and State of Vermont, have invented a new and useful improvement in the revolving plane, better adapted it to the purpose of trying out beach or timber, for Joiners bench planes and which is also applicable to other purposes, and that the following is a full and exact description thereof — The apparatus I use in this operation are any number of gouge shaped cutters applied in the manner of plane irons to a rounded off end of a cylinder which is attached to one end of a horizontal shaft or arbor, supported and turning in collars, on a strong frame or bench and a carriage on which to fasten the timber to be operated upon — A more particular description of these parts here follows — 1st The frame — the particular construction of this is not essential provided it be sufficiently strong to prevent shaking or trembling when in operation and that it furnish proper seats on which to place the collars in which the shaft turns — 2d The shaft to the left hand end of which the cylinder is attached should be iron or steel and is placed horizontally, and parallel with the front edge of the frame revolving towards the front in collars or boxes made fast to the frame and is prevented from having any endwise action by shoulders formed on the shaft, between which the collars are accurately fitted — 3d The disk or cutting end of the cylinder. I usually make of cast iron the most convenient size is about 15 inches diameter, The most important part of the disk however is the shape of that part where the cutting is performed or where the cutters are inserted — The shape alluded to is produced by rounding over the corner, preventing any angle between the cylindrical surface and the circular end. A section of the curve called a parabola forms a better shape for this purpose, than an arc of a circle - The gouge shaped cutters are inserted in such manner, that their cutting edges project from this rounded over corner of the cylinder the same as the iron of a common plane projects from its face -

4th The carriage is a plate of metal or timber of sufficient length and width to receive a piece of timber for a joiners plane and is supported on suitable ways on which it slides, in a direction, along the face of the disk or at right angles, to the shaft, from the front towards the rear of the frame, being kept steady in its place by a groove in its under side which receives the upper edge of one of the ways - The edge of the carriage next the disk passes as near its face as possible without coming in contact with the cutters - The carriage should not pass precisely parallel with the face of the disk but should retreat a little as it passes by it to prevent the cutters operating a second time in their returning stroke on the face of the timber, one or more arms project from the left hand edge of the carriage, through which adjusting screws are passed, the ends of which rest and slide upon the way and support that edge of the carriage, and are further used to elevate or depress that edge of the carriage, in order that it may be so adjusted as to insure the timbers being wrought square -

The timber may be made fast to the carriage by any of the ordinary means - As a facility for giving the timber any required size, I either graduate the carriage itself into inches and parts of inches, or fitt parts of box wood rules already graduated into it, even with the surface, which at all times shows the size the piece of timber will ~~will~~ be when the part of it which projects over the carriage is removed -

5th The mode of operation as may be inferred from the above is to place a piece of timber on the carriage, secured by screws or otherwise firmly in its place, with the surplus part or part to be taken off projecting over the edge of the carriage - The cylinder with its cutters being put into rapid revolution, the carriage with the timber upon it is passed by the disk or end of the cylinder, the cutters removing the surplus part leaving the face of the timber true and even - The carriage is then drawn back and the face of the timber which is already made true is next turned down upon the carriage and again passed through leaving the second

9788X face of the carriage was properly adjusted at right angles to the first made face. The carriage is again brought back the timbers plac[illegible] on one of its trued faces even with the graduation on the carriage designating its requisite size and again passed through &c.

I do not claim the invention of the circular plane cutting on the end of a cylinder having repeatedly seen one in operation in a grist mill: used for chipping dyewoods and other purposes as early as at 1806. Nor do I now lay claim to the cylindrical plane or that cutting on the periphery or face of a cylinder although I am warranted in believing myself to be the first inventor of that instrument, having invented fitted up and put into use a pair of metalic ones in the State of Connecticut in the year 1826.7. But what I do claim as my invention and for which I now ask letters patent, is the mode of adapting it to the purpose of trying out beach or other Timber for joiners planes, by the rounded off corner and the use of concave or gouged shaped cutters. Wishing it to be distinctly understood that I claim nothing of the above described machine except simply the peculiar shape of the cutters and the curved corner of the cylinder the advantages of which is to give the cutter a forward inclination of about forty-five degrees at whatever point of the curved part of the instrument, the portion of the timber to be removed should present itself. Thus where there is but little to be taken off, the cutting is principally at or near the face of the disk, but when a sufficient thickness presents itself to be removed, to extend all along the rounded end of the cylinder to the periphery the cutting is performed alongon all that part and the curved cutters present their edges at about the abovenamed angle not only at the end of the cylinder but at the periphery and at all points between.

Witnesses
Asa Keyes
Jon<sup></sup>a. D. Bradley

Samuel Hedge

1232 [illegible]

[illegible]

[illegible]
M.G.